US011221994B2

(12) United States Patent
Trim et al.

(10) Patent No.: US 11,221,994 B2
(45) Date of Patent: Jan. 11, 2022

(54) CONTROLLING DOCUMENT EDITS IN A COLLABORATIVE ENVIRONMENT

(71) Applicant: INTERNATIONAL BUSINESS MACHINES CORPORATION, Armonk, NY (US)

(72) Inventors: Craig M. Trim, Ventura, CA (US); Shikhar Kwatra, Research Triangle PK, NC (US); Joseph Kozhaya, Research Triangle PK, NC (US); Aaron K. Baughman, Silver Spring, MD (US)

(73) Assignee: International Business Machines Corporation, Armonk, NY (US)

( * ) Notice: Subject to any disclaimer, the term of this patent is extended or adjusted under 35 U.S.C. 154(b) by 317 days.

(21) Appl. No.: 16/458,294

(22) Filed: Jul. 1, 2019

(65) Prior Publication Data

US 2021/0004356 A1    Jan. 7, 2021

(51) Int. Cl.
*G06F 40/00* (2020.01)
*G06F 16/176* (2019.01)
*G06N 20/00* (2019.01)
*G06F 16/93* (2019.01)
*G06F 40/30* (2020.01)
*G06F 40/197* (2020.01)
*G06F 40/166* (2020.01)

(52) U.S. Cl.
CPC .......... *G06F 16/1767* (2019.01); *G06F 16/93* (2019.01); *G06F 40/166* (2020.01); *G06F 40/197* (2020.01); *G06F 40/30* (2020.01); *G06N 20/00* (2019.01)

(58) Field of Classification Search
CPC ...... G06F 16/93; G06F 40/166; G06F 40/197; G06F 40/30
See application file for complete search history.

(56) References Cited

U.S. PATENT DOCUMENTS

2005/0132070 A1    6/2005  Redlich
2012/0317497 A1    12/2012 Red
(Continued)

OTHER PUBLICATIONS

James, Tad; NLP and Critical Thinking; https://www.nlpcoaching.com/nlp-critical-thinking-revisited/; retrieved from the Internet Mar. 25, 2019; 4 pages.
(Continued)

*Primary Examiner* — Scott T Baderman
*Assistant Examiner* — Barbara M Level
(74) *Attorney, Agent, or Firm* — Schmeiser, Olsen & Watts; Brian M. Restauro

(57) ABSTRACT

An approach is provided for controlling an edit of content. It is determined that an edit of content is being performed by a user. A criticality score of the content is determined by using a natural language processing technique. The criticality score indicates a measure of sensitivity of the content. A behavior of the user while editing the content is identified. A measure of deviation is determined between the behavior of the user and a pattern of historical editing behavior of user(s). Based on the criticality score and the measure of the deviation, an edit risk score is determined. The edit risk score is determined to exceed a threshold score. Responsive to determining that the edit risk score exceeds the threshold score, an alert is transmitted to the user. The alert indicates to the user that the edit of the content is an unexpected edit.

18 Claims, 5 Drawing Sheets

(56) References Cited

U.S. PATENT DOCUMENTS

| | | |
|---|---|---|
| 2016/0078247 A1 | 3/2016 | Tucker |
| 2018/0107838 A1 | 4/2018 | Amarendran |
| 2018/0239507 A1* | 8/2018 | Bui .................. G06F 16/345 |
| 2019/0171846 A1* | 6/2019 | Conikee ............ G06F 21/52 |
| 2020/0004808 A1* | 1/2020 | Yao .................. G06F 40/106 |
| 2020/0387567 A1* | 12/2020 | Loforte ............. G06F 16/313 |

OTHER PUBLICATIONS

Natural Language Processing (NLP) Techniques for Extracting Information; https://www.searchtechnologies.com/blog/natural-language-processing-techniques; retrieved from the Internet Mar. 25, 2019; 13 pages.

Natural Language Processing; https://www.sas.com/en_id/insights/analytics/what-is-natural-language-processing-nlp.html; retrieved from the Internet; Mar. 25, 2019; 9 pages.

* cited by examiner

CONTROLLING DOCUMENT EDITS IN A COLLABORATIVE ENVIRONMENT

BACKGROUND

The present invention relates to document management, and more particularly to controlling unexpected document edits.

Cloud-based document management and sharing systems are increasing in popularity and becoming the standard approach for how people in large organizations share content and collaborate on projects. Because a large team of people working on a project may be editing the same document, there may be a significant number of versions of the document. For example, tens of people on a team that is planning a conference may be editing the same documents, where the editing causes some of those documents to have thousands of versions.

SUMMARY

In one embodiment, the present invention provides a computer-implemented method. The method includes determining, by one or more processors, that an edit of content is being performed by a user. The method further includes determining, by the one or more processors, a criticality score of the content by using a natural language processing technique. The criticality score indicates a measure of sensitivity of the content. The method further includes identifying, by the one or more processors, a behavior of the user while editing the content. The method further includes determining, by the one or more processors, a measure of deviation between the behavior of the user and a pattern of historical behavior of one or more users while the one or more users edited the content. The method further includes based on the criticality score and the measure of the deviation between the behavior of the user and the pattern of historical behavior, determining, by the one or more processors, an edit risk score. The edit risk score indicates a probability that the edit of the content is an unexpected edit of the content. The method further includes determining, by the one or more processors, that the edit risk score exceeds a threshold score. The method further includes responsive to determining that the edit risk score exceeds the threshold score, transmitting, by the one or more processors, an alert to the user indicating to the user that the edit of the content is the unexpected edit.

In another embodiment, the present invention provides a computer program product which includes a computer readable storage medium having computer readable program code stored on the computer readable storage medium. The computer readable program code is executed by a central processing unit (CPU) of a computer system to cause the computer system to perform a method. The method includes the computer system determining that an edit of content is being performed by a user. The method further includes the computer system determining a criticality score of the content by using a natural language processing technique. The criticality score indicates a measure of sensitivity of the content. The method further includes the computer system identifying a behavior of the user while editing the content. The method further includes the computer system determining a measure of deviation between the behavior of the user and a pattern of historical behavior of one or more users while the one or more users edited the content. The method further includes determining an edit risk score. The edit risk score indicates a probability that the edit of the content is an unexpected edit of the content. The method further includes the computer system determining that the edit risk score exceeds a threshold score. The method further includes responsive to determining that the edit risk score exceeds the threshold score, the computer system transmitting an alert to the user indicating to the user that the edit of the content is the unexpected edit.

In another embodiment, the present invention provides a computer system including a central processing unit (CPU); a memory coupled to the CPU; and a computer readable storage medium coupled to the CPU. The computer readable storage medium contains instructions that are executed by the CPU via the memory to implement a method. The method includes the computer system determining that an edit of content is being performed by a user. The method further includes the computer system determining a criticality score of the content by using a natural language processing technique. The criticality score indicates a measure of sensitivity of the content. The method further includes the computer system identifying a behavior of the user while editing the content. The method further includes the computer system determining a measure of deviation between the behavior of the user and a pattern of historical behavior of one or more users while the one or more users edited the content. The method further includes determining an edit risk score. The edit risk score indicates a probability that the edit of the content is an unexpected edit of the content. The method further includes the computer system determining that the edit risk score exceeds a threshold score. The method further includes responsive to determining that the edit risk score exceeds the threshold score, the computer system transmitting an alert to the user indicating to the user that the edit of the content is the unexpected edit.

DETAILED DESCRIPTION

Overview

When multiple users are editing the same documents via a known document management and sharing system, critical content can be accidentally deleted. While it is technically feasible to recover the deleted content, the recovery is usually a tedious process that involves a person recovering older versions of the document and consolidating the differences between the recovered older versions to obtain an updated version. Projects having large teams editing the same documents exacerbate the aforementioned challenge of recovering accidentally deleted content. For example, as part of a conference-planning project, one column of a spreadsheet having the overall agenda for the conference is accidentally deleted from one of the sheets. The accidental deletion is discovered only after many additional updates are completed by other users. Finding the correct version of the spreadsheet to recover and consolidate with the latest version is a difficult task.

Embodiments of the present invention address the aforementioned unique challenges of recovering critical content that is accidentally deleted in a collaborative editing environment. In one embodiment, a content edit control system detects and alerts a user in response to the user attempting to complete an edit of content in an unexpected manner. As used herein, an edit of content is defined as a deletion or an update of the content. In one embodiment, the content edit control system balances a number of alerts for actual unexpected edits and a number of false positive detections of unexpected edits by analyzing multiple factors to obtain a score indicating a likelihood of an unexpected edit. In one embodiment, the factors include (1) a criticality of content based on natural language processing analysis, (2) a behavior of the user editing the content compared with historical user behavior regarding editing the content, (3) a degree of the change to the content resulting from the edit, and (4) a user-initiated tagging of the content indicating that the content is critical. Embodiments of the present invention determine an edit risk score that is a weighted average of initial scores associated with the aforementioned factors and the edit risk score indicates a probability of the user editing the content in an unexpected manner.

System for Controlling an Edit of Content

Figure 1:
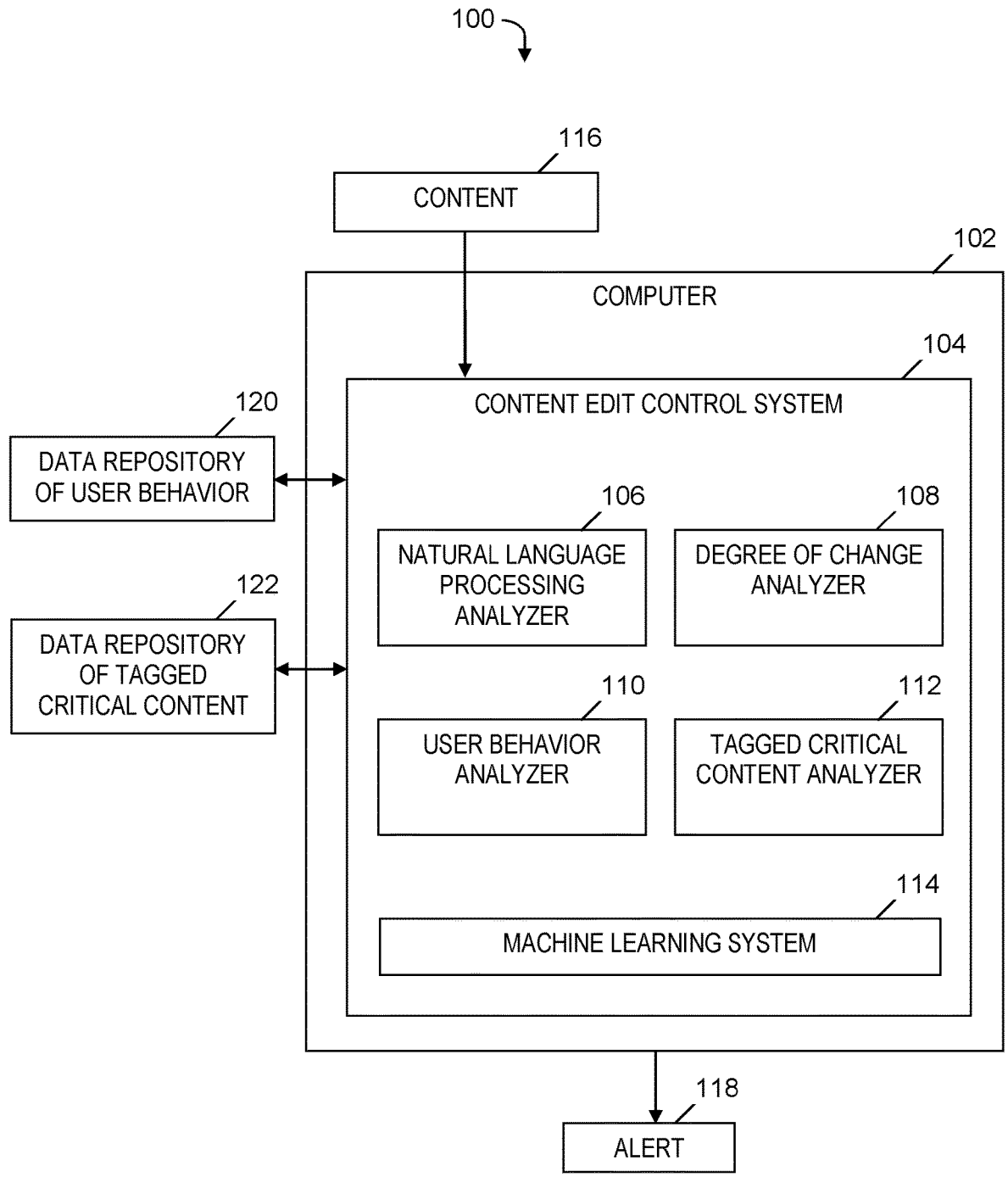
FIG. 1 is a block diagram of a system for controlling an edit of content, in accordance with embodiments of the present invention.

FIG. 1 is a block diagram of a system 100 for controlling an edit of content, in accordance with embodiments of the present invention. System 100 includes a computer 102, which executes a software-based content edit control system 104, which includes a natural language processing analyzer 106, a degree of change analyzer 108, a user behavior analyzer 110, a tagged critical content analyzer 112, and a machine learning system 114.

In one embodiment, computer 102 is in operatively coupled via a computer network (not shown) with another computer (not shown), which executes a software application (not shown) by which a user is editing content 116. Alternatively, computer 102 executes the software application by which the user is editing content 116.

Content edit control system 104 receives content 116 and performs a combination of one or more analyses provided by natural language processing analyzer 106, degree of change analyzer 108, user behavior analyzer 110, and tagged critical content analyzer 112.

Natural language processing analyzer 106 uses a natural language processing (NLP) technique to analyze content 116 to identify a criticality of content 116 (i.e., identify whether content 116 is critical content). Critical content is content that includes information that is sensitive to a business or other organization that controls or is otherwise associated with the content. For example, NLP analyzer 106 identifies items in content 116 that reference dates, schedules, revenues, salaries, or bands (i.e., levels in an organizational hierarchy that define employee roles and compensation) and designates these identified items as being critical content. In one embodiment, criticality of content identified by NLP analyzer 106 consists of multiple classes and is not necessarily binary.

In one embodiment, NLP analyzer 106 uses topic analysis to identify critical content. NLP analyzer 106 places each sentence that contains a clause inside a vector in a vector space. NLP analyzer 106 analyzes the vector space for similarity via sequence, where the sequence is a position within a document which includes content 116. NLP analyzer 106 uses syntactic analysis to identify links between clusters by determining which clause leads into the introduction or reference of another clause. NLP analyzer 106 outputs a vector space generated network in which each node is a topic cluster and each edge is a link between topic clusters. NLP analyzer 106 determines that if an item of information in content 116 is deleted without substantially affecting the vector space generated network, then the item is not considered critical content. The degree of impact to the vector space generated network determines how critical the item is to the overall document.

User behavior analyzer 110 determines the editing behavior of the user making the edit to content 116 and compares the behavior of the user to (i) a pattern of historical editing behavior of one or more other users during previous edits of content 116 and/or (ii) the editing behavior of the user during previous edits of content 116. For example, user behavior analyzer 110 determines that the user is deleting an entire column in the spreadsheet and further determines the current user editing behavior does not match a pattern of historical editing behavior in which other users have added or removed a line in a spreadsheet or changed a limited number of cells in the spreadsheet, without ever deleting a complete column. In this example, based on the current user behavior not matching the pattern of historical behavior of other users, content edit control system 104 transmits an alert 118 to the user about the current edit being an unexpected edit.

As another example, user behavior analyzer 110 determines that the user is editing cells in a first portion of a spreadsheet, which does not match that user's previous editing behavior of editing only cells in a second portion of the spreadsheet. Because of the mismatch between the portions of the spreadsheet being edited by the user's current editing and the portions that the user previously edited, content edit control system 104 transmits alert 118 to the user about the current edit being an unexpected edit. User behavior analyzer 110 updates a data repository of user behavior 120 to include the current editing of content 116.

In one embodiment, content edit control system 104 provides options for a user to opt in and opt out of the collection of data about the user's behavior by user behavior analyzer 110.

Degree of change analyzer 108 compares the initial content (i.e., content 116 prior to a completion of the current edit) to the edited content (i.e., content 116 after the current edit is completed) and determines a measure of significance in the change from the initial content to the edited content. Determining the measure of significance uses different algorithms, depending on the type of content 116. For example, degree of change analyzer 108 determines that a first edit of content 116 that changes $1000 to $950 corresponds to a measure of significance that is less than another measure of significance corresponding to a second edit of content 116 that changes $1000 to $10,000 because the amount of change or percentage of change from the initial value of $1000 is less in the first edit than in the second edit.

As another example, degree of change analyzer 108 employs NLP techniques including topic and entity extraction from text in content 116 to detect whether a change in the text retains a same meaning or a similar meaning of the original text in content 116, or whether the change in the text significantly changes the meaning of the original text. In one embodiment, degree of change analyzer 108 determines whether a change to the text in content 116 negates the meaning of the original text, which indicates a significant change in the meaning of the original text. Degree of change analyzer 108 determines the measure of significance in the change in the text which is proportional to the change in the topics and entities expressed by the text.

Tagged critical content analyzer 112 tags content 116 or items included in content 116 as being critical content. In response to receiving an instruction from a user to tag content 116 as being critical content, tagged critical content analyzer 112 tags content 116. Tagged critical content analyzer 112 alerts one or more other users who attempt to edit the tagged content 116. In one or more embodiments, tagged critical content analyzer 112 displays the alert to other users that content 116 is tagged as being critical content by highlighting critical items in content 116 (e.g., highlight a cell in a spreadsheet or display text in a particular font color). After content 116 is tagged as being critical content, tagged critical content analyzer 112 updates a data repository of tagged critical content 122 with a specification of content 116 as being critical content.

In one embodiment, tagged critical content analyzer 112 uses a pattern of tagging items in content 116 to train a machine learning model in machine learning system 114 to predict a criticality of content 116. In one embodiment, tagged critical content analyzer 112 tags items in content 116 to create labeled data, which are input into machine learning algorithms provided by machine learning system 114 to predict a criticality of content 116.

The functionality of the components shown in FIG. 1 is described in more detail in the discussion of FIGS. 2A-2B, FIG. 3, and FIG. 4 presented below.

Process for Controlling an Edit of Content

Figure 2A:
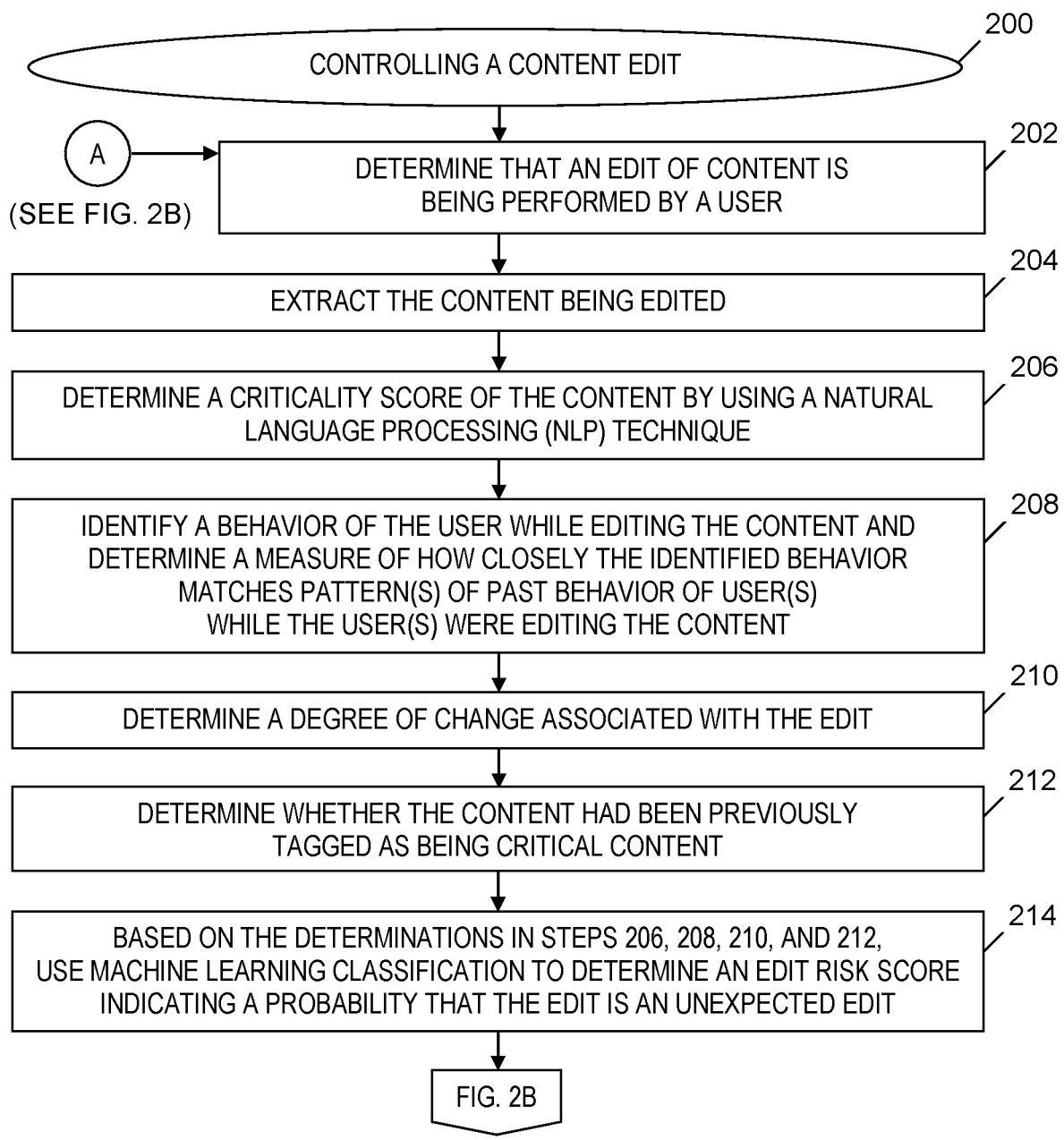
FIGS. 2A-2B depict a flowchart of a process of controlling an edit of content, where the process is implemented in the system of FIG. 1, in accordance with embodiments of the present invention.
Figure 2B:
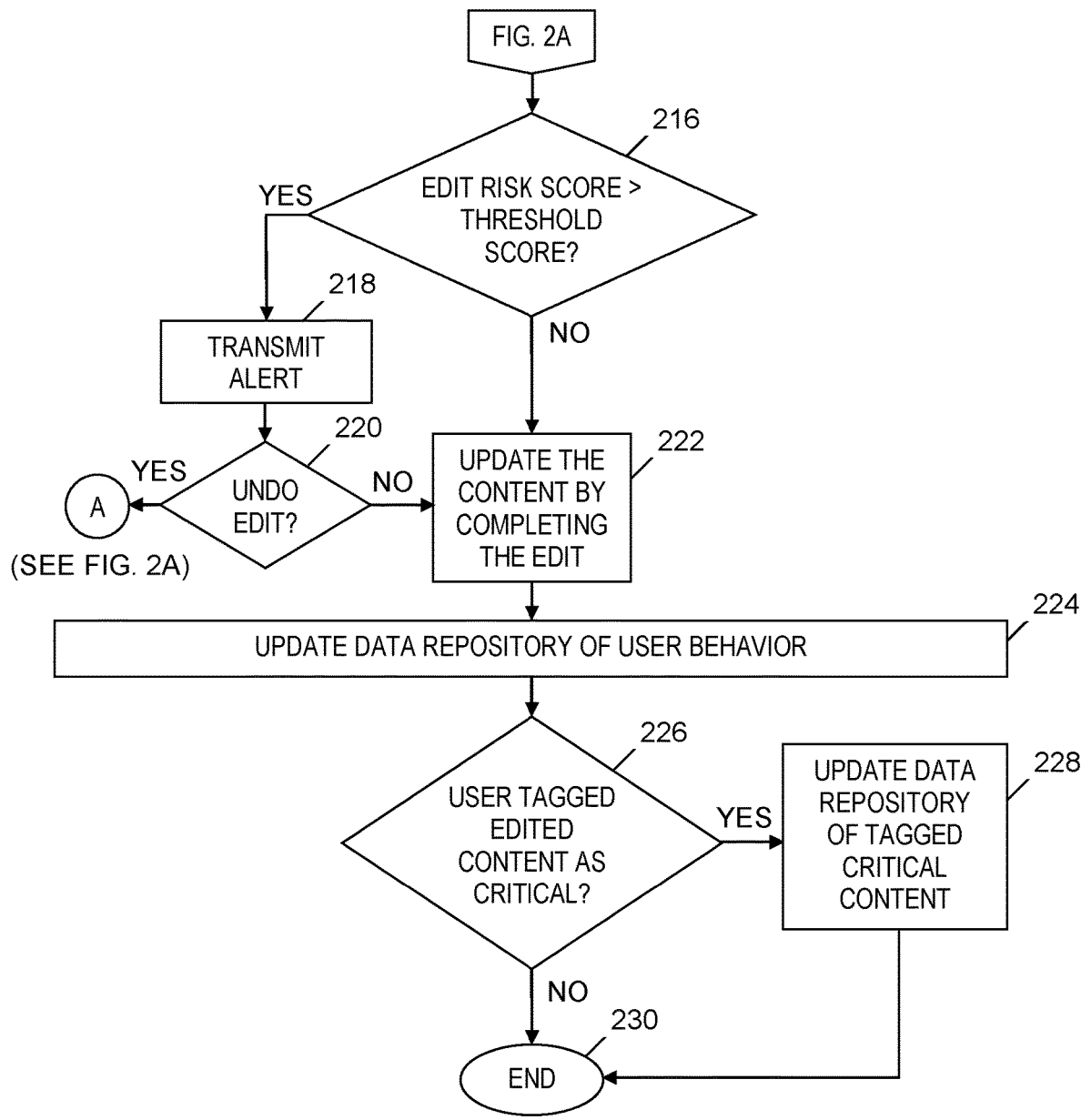

FIGS. 2A-2B depict a flowchart of a process of controlling an edit of content, where the process is implemented in the system of FIG. 1, in accordance with embodiments of the present invention. The process of FIG. 2A starts at step 200. In step 202, content edit control system 104 (see FIG. 1) determines that an edit of content 116 (see FIG. 1) is being performed by a user who is utilizing computer 102 (see FIG. 1) or another computer which is in communication with computer 102 (see FIG. 1) via a computer network.

In one embodiment, content edit control system 104 (see FIG. 1) detects in step 202 that the user opens an electronic document in edit mode and edits the electronic document by deleting or updating content 116 (see FIG. 1).

In step 204, content edit control system 104 (see FIG. 1) extracts the content 116 (see FIG. 1), which is being edited by the user.

In step 206, content edit control system 104 (see FIG. 1) determines a criticality score of content 116 (see FIG. 1) by using a NLP technique provided by NLP analyzer 106 (see FIG. 1). In one embodiment, NLP analyzer 106 (see FIG. 1) identifies sensitive information by applying a combination of rule-based methods and machine learning methods (e.g., Max Entropy, conditional random field, etc.) to extract entities from edited text and assign a criticality score based on the sensitivity associated with the extracted entities. For example, if NLP analyzer 106 (see FIG. 1) determines that the text being edited includes revenue information, salaries, bands of employees, or schedules of an agenda, NLP analyzer 106 (see FIG. 1) designates the text as being critical content and assigns a criticality score to the text that indicates that the text is critical content. In one embodiment, NLP analyzer 106 (see FIG. 1) determines the criticality score as a number in the range of 0 to 1, inclusive, where a number closer to the number 1 indicates content that is more critical or more sensitive.

In step 208, content edit control system 104 (see FIG. 1) identifies a behavior of the user while the user is editing content 116 (see FIG. 1) and (i) determines a first measure (i.e., a user behavior content edit score) of how closely the identified behavior matches pattern(s) of historical behavior of other user(s) while the other user(s) edited content 116 (see FIG. 1) (i.e., determines a measure of a deviation between the aforementioned identified behavior of the user and the aforementioned pattern(s) of historical behavior of the user(s)) and (ii) determines a second measure (i.e., user behavior structure edit score) of how closely the identified behavior matches the previous editing behavior of the user while the user edited the same or similar content (i.e., determines a measure of a deviation between the identified behavior of the user and the aforementioned previous editing behavior of the user).

For the first measure, user behavior analyzer 110 (see FIG. 1) tracks a history of amounts of edits of content 116 (see FIG. 1) by other users and determines statistical measures related to the tracked amounts. In one embodiment, user behavior analyzer 110 (see FIG. 1) determines the number of words being edited in the edits of the other users and computes statistics of those edits, including the mean and standard deviation. User behavior analyzer 110 (see FIG. 1) determines the number of standard deviations between the number of words in the user's current edit and the aforementioned computed mean for the tracked amounts. User behavior analyzer 110 (see FIG. 1) assigns a particular user behavior content edit score based on the number of standard deviations between the number of words in the user's current edit and the computed mean.

For the second measure, user behavior analyzer 110 (see FIG. 1) tracks the history edits of content 116 (see FIG. 1) by the user, where the history indicates the structural elements of content 116 (see FIG. 1) that were edited by the user. For content in a spreadsheet, structural elements include particular rows, columns, and/or cells in the spreadsheet that a user has edited. For content that includes text in a word processing document, structural elements include particular paragraphs, lines, and/or words in the document. User behavior analyzer 110 (see FIG. 1) determines how closely the current edit of the user matches the tracked history of edits by the user and determines a user behavior structure edit score based on the determination of how closely the current edit matches the tracked history of edits by the user. In one embodiment, content edit control system 104 (see FIG. 1) provides options for a user to opt in and opt out of the tracking of a history of the user's editing behavior by user behavior analyzer 110 (see FIG. 1).

For example, user behavior analyzer 110 (see FIG. 1) tracks a history of edits of a spreadsheet by User U that indicates that User U has edited only column J and column C of the spreadsheet. If a current edit by User U attempts to edit column A, user behavior analyzer 110 (see FIG. 1) determines a relatively low user behavior structure edit score.

In one embodiment, user behavior analysis 110 (see FIG. 1) determines a user behavior score by determining the mean of the user behavior content edit score and the user behavior structure edit score. In another embodiment, user behavior analysis 110 (see FIG. 1) determines a user behavior score by determining the mean of the user behavior content edit score weighted by a first weight and the user behavior structure edit score weighted by a second weight.

In step 210, degree of change analyzer 108 (see FIG. 1) determines a degree of change associated with the edit being performed on content 116 (see FIG. 1). Degree of change analyzer 108 (see FIG. 1) determines and compares the original content 116 and the updated content to evaluate a measure of significance of the edit. Degree of change analyzer 108 (see FIG. 1) selects from multiple algorithms to determine the significance of the edit, where the selection is based on the type of content 116 (see FIG. 1). If the content 116 includes numerical values, such as revenue, salaries, and sales figures, then degree of change analyzer 108 (see FIG. 1) applies numerical comparison between the original content 116 and the updated content to determine an amount (i.e., degree) of change in the numerical values between the original content 116 and the updated content. Based on the comparison and the amount of change, degree of change analyzer 108 (see FIG. 1) determines a measurement of the significance of the edit, where the measurement is proportional to the amount of the change in the numerical values. For example, degree of change analyzer 108 (see FIG. 1) assigns a relatively low degree of change score to an edit that changes $1000 to $950 and assigns a relatively high degree of change score to another edit that changes $1000 to $10,000.

In one embodiment, for content 116 that includes text, degree of change analyzer 108 (see FIG. 1) utilizes NLP algorithms to detect negation (i.e., detects that the original content and the updated content describe concepts that are opposite in meaning). If degree of change analyzer 108 (see FIG. 1) detects the negation, then the degree of change is significant and the degree of change score is 1 or a number relatively close to 1.

In one embodiment, for content 116 that includes text, degree of change analyzer 108 (see FIG. 1) uses NLP algorithms to apply topic and entity extraction to the text. Degree of change analyzer 108 (see FIG. 1) determines that the significance of the edit and the degree of change score is proportional to the change in the topics and entities expressed in the text.

In one embodiment, degree of change analyzer 108 (see FIG. 1) outputs a degree of change score in the range of 0 to 1, inclusive, where a degree of change score closer to 1 indicates a more significant degree of change in the edit.

In step 212, tagged critical content analyzer 112 (see FIG. 1) determines whether content 116 (see FIG. 1) had been previously tagged as being critical content. In one embodiment, tagged critical content analyzer 112 (see FIG. 1) assigns the current edit of content 116 (see FIG. 1) a tagged critical content score of 1 if content 116 (see FIG. 1) had been previously tagged by user(s) as being critical content and assigns the current edit a tagged critical content score of 0 if content 116 (see FIG. 1) had not been previously tagged by user(s) as being critical content.

In step 214, based on the determinations in steps 206, 208, 210, and 212, content edit control system 104 (see FIG. 1) uses a machine language classification provided by machine learning system 114 (see FIG. 1) to determine an edit risk score, which indicates a probability that the edit being performed on content 116 (see FIG. 1) is an unexpected edit.

In one embodiment, content edit control system 104 (see FIG. 1) runs a machine learning classification algorithm to predict a likelihood of the user making an unexpected edit to critical content based on the scores computed in steps 206, 208, 210, and 212. The output of the machine learning classification includes (i) a binary (i.e., 0 or 1), indicating whether the user is likely to make an unexpected edit of critical content, and (ii) a probability of the classification.

In one embodiment, content edit control system 104 (see FIG. 1) determines the edit risk score by calculating the mean of the criticality score determined in step 206, the user behavior score determined in step 208, the degree of change score determined in step 212, and the tagged critical content score determined in step 212. Alternatively, content edit control system 104 (see FIG. 1) determines the edit risk score by calculating the mean of a combination of the aforementioned criticality score, the user behavior score, the degree of change score, and the tagged critical content score. As another alternative, content edit control system 104 determines the edit risk score by calculating a weighted average of the aforementioned criticality score, the user behavior score, the degree of change score, and the tagged critical content score, or by calculating a weighted average of a combination of the criticality score, the user behavior score, the degree of change score, and the tagged critical content score.

In one embodiment, content edit control system 104 (see FIG. 1) modifies the aforementioned weights based on how rapidly changes to content 116 (see FIG. 1) are occurring and how challenging it would be to restore content 116 (see FIG. 1) to an earlier version that existed prior to the rapid changes. The level of challenge to restore the content 116 (see FIG. 1) to the earlier version varies directly with the frequency of the changes to content 116 (see FIG. 1). Content edit control system 104 (see FIG. 1) determines that multiple edits of content 116 (see FIG. 1) are occurring over a given time period at a frequency that exceeds a frequency threshold. Based on the frequency of the multiple edits exceeding the frequency threshold, content edit control system 104 (see FIG. 1) increases the weights assigned to the aforementioned scores.

After step 214, the process of FIGS. 2A-2B continues with step 216 in FIG. 2B.

In step 216, content edit control system 104 (see FIG. 1) determines whether the edit risk score determined in step 214 (see FIG. 2A) is greater than a threshold score. If content edit control system 104 (see FIG. 1) determines in step 216 that the edit risk score is greater than the threshold score, then the Yes branch of step 216 is followed and step 218 is performed. In one embodiment, the threshold score is based on policies that assign a lower threshold score for content 116 (see FIG. 1) that is deemed to be more important and a higher threshold score for content 116 (see FIG. 1) that is deemed to be less important.

In step 218, content edit control system 104 (see FIG. 1) transmits an alert to notify the user that the edit being performed on content 116 (see FIG. 1) is an unexpected edit of critical content.

In step 220, content edit control system 104 (see FIG. 1) determines whether the user has sent an instruction to content edit control system 104 (see FIG. 1) to undo the edit of content 116 (see FIG. 1). If content edit control system 104 (see FIG. 1) determines in step 220 that the user has sent the instruction to undo the edit of the content 116 (see FIG. 1), then the Yes branch of step 220 is followed, content edit control system 104 (see FIG. 1) undoes the edit of content 116 (see FIG. 1), and the process of FIGS. 2A-2B loops back to step 202 in FIG. 2A, which gives the user the opportunity to initiate a new edit of content 116 (see FIG. 1) or an edit of other content.

Returning to step 220, if content edit control system 104 (see FIG. 1) determines that the user has not sent the instruction to undo the edit of content 116 (see FIG. 1), then the No branch of step 220 is followed and step 222 is performed.

In step 222, content edit control system 104 (see FIG. 1) updates content 116 (see FIG. 1) by completing the edit determined in step 202 (see FIG. 2A).

In step 224, content edit control system 104 (see FIG. 1) updates data repository of user behavior 120 (see FIG. 1) with a specification of the edit of content 116 (see FIG. 1)

in association with an identification of the user that initiated the edit. In one embodiment, the specification of the edit includes a specification of particular item(s) in content 116 (see FIG. 1) that were updated in step 222 and a specification of locations of the item(s) within an electronic document (e.g., word processing document or spreadsheet document).

In step 226, content edit control system 104 (see FIG. 1) determines whether the user tagged the edited content 116 (see FIG. 1) as being critical content. If content edit control system 104 (see FIG. 1) determines in step 226 that the user tagged the edited content as being crucial content, then the Yes branch of step 226 is followed and step 228 is performed.

In step 228, content edit control system 104 (see FIG. 1) updates data repository of tagged critical content 228. After step 228, the process of FIGS. 2A-2B ends at step 230.

Returning to step 226, if content edit control system 104 (see FIG. 1) determines that the user did not tag the edited content as being critical content, then the No branch of step 226 is followed and the process of FIGS. 2A-2B ends at step 230.

Returning to step 216, if content edit control system 104 (see FIG. 1) determines that the edit risk score is not greater than the threshold score, then the No branch of step 216 is followed and step 222 if performed, as described above.

In alternate embodiments, a proper subset of steps 206, 208, 210, and 212 in FIG. 2A is performed in the process of FIGS. 2A-2B and the edit risk score determined in step 214 (see FIG. 2A) is based on the score(s) determined in the aforementioned proper subset of steps.

In one embodiment, prior to step 202 (see FIG. 2A), tagged critical content analyzer 112 (see FIG. 1) tags content 116 (see FIG. 1) as being critical content by other user(s). Machine learning system 114 (see FIG. 1) trains a machine learning model by using the tagged content 116 (see FIG. 1). Determining the edit risk score in step 214 (see FIG. 2A) is further based on the trained machine learning model and the tagged content 116 (see FIG. 1).

In one embodiment, tagged critical content analyzer 112 (see FIG. 1) tags other content as being critical in response to an initiation of the tagging by the user. Content edit control system 104 (see FIG. 1) determines that an edit of the other content is being performed by another user. Responsive to the tagging of the other content as being critical content and the determining that the edit of the other content is being performed by the other user, content edit control system 104 (see FIG. 1) transmits a notification to the other user indicating to the other user that the edit of the other content is an unexpected edit of the other content.

In one embodiment, content edit control system 104 (see FIG. 1) receives instruction(s) from the user to (i) complete the edit of content 116 (see FIG. 1) even though the edit of the content is an unexpected edit and (ii) tag the content 116 (see FIG. 1) as being critical content. Based on the instruction(s) received from the user, content edit control system 104 (see FIG. 1) completes the edit of content 116 (see FIG. 1) in step 222, which results in the edited content. Based on the instruction(s) received from the user and subsequent to the completion of the edit of content 116 (see FIG. 1), content edit control system 104 (see FIG. 1) tags the edited content as being critical content. Subsequent to the tagging of the edited content, content edit control system 104 (see FIG. 1) determines that a second edit of the edited content is being performed by a second user. Based on the edited content being tagged as critical content, content edit control system 104 (see FIG. 1) determines that the second edit of the edited content is an unexpected edit of the edited content, without a determination of a criticality score of the edited content or a determination of a behavior of the second user while the second user is editing the edited content.

Example

Figure 3:
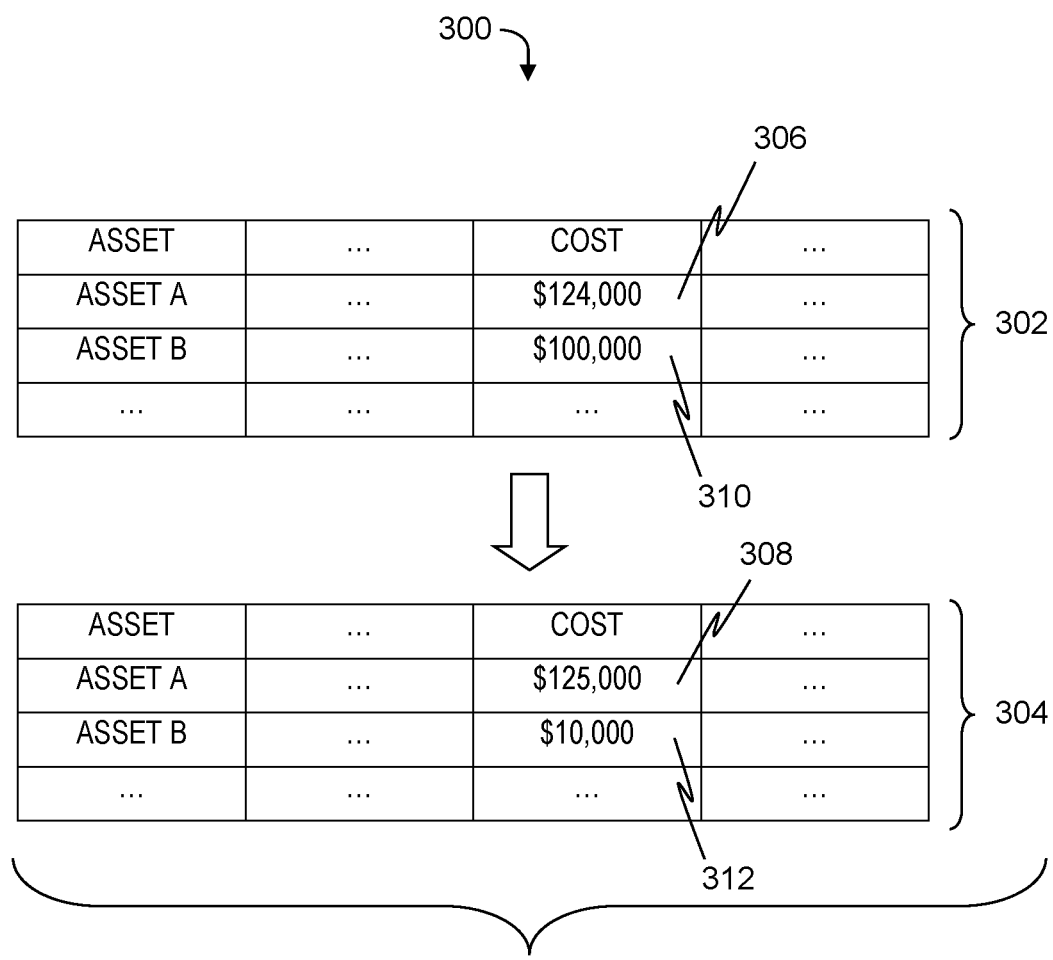
FIG. 3 is an example of controlling an edit of a spreadsheet document using the process of FIGS. 2A-2B, in accordance with embodiments of the present invention.

FIG. 3 is an example 300 of controlling an edit of a spreadsheet document using the process of FIGS. 2A-2B, in accordance with embodiments of the present invention. Example 300 illustrates a first edit and a second edit of values in an initial spreadsheet 302 to generate edited values in an edited spreadsheet 304, which is an edited version of initial spreadsheet 302. For the first edit, in step 202 (see FIG. 2A), content edit control system 104 (see FIG. 1) determines that a user is performing the first edit of a cell 306 in an initial spreadsheet 302. The first edit updates the $124,000 cost of Asset A (i.e., the $124,000 value in cell 306) to an updated value of $125,000, as shown in a cell 308 in edited spreadsheet 304. In step 204 (see FIG. 2A), content edit control system 104 (see FIG. 1) extracts the value of $124,000 from cell 306 being edited by the user. In step 206 (see FIG. 2A), NLP analyzer 106 (see FIG. 1) determines that the first edit of cell 306 is associated with the word "COST" and determines that the word "COST" indicates a highly sensitive topic (i.e., the cost of an asset identified by the name in the column labeled "ASSET"). Because cell 306 includes a value associated with a highly sensitive topic, NLP analyzer 106 (see FIG. 1) assigns a criticality score of 1 to the first edit (i.e., a score tentatively indicating a high probability of the first edit being an unexpected edit).

In step 208 (see FIG. 2A), user behavior analyzer 110 (see FIG. 1) identifies the current editing behavior of the user as editing a cell that includes a cost associated with an asset's name, determines from historical editing behavior of the user retrieved from data repository 120 (see FIG. 1) that the user has previously edited cells in previous versions of spreadsheet 302 that include costs associated with names of assets, and determines that the current editing behavior matches the historical editing behavior of the user. Based on the match to the historical editing behavior, user behavior analyzer 110 (see FIG. 1) assigns a user behavior score of 0 to the current editing behavior (i.e., a score tentatively indicating a low probability that the first edit is an unexpected edit). In one embodiment, content edit control system 104 (see FIG. 1) provides options for a user to opt in and opt out of the collection, storage, and/or retrieval of the user's editing behavior by user behavior analyzer 110 (see FIG. 1).

In step 210 (see FIG. 2A), degree of change analyzer 108 (see FIG. 1) determines a degree of change associated with the first edit. The first edit will change the $124,000 value to a value of $125,000, which is shown in spreadsheet 304. Degree of change analyzer 108 (see FIG. 1) determines in step 210 that the $1000 difference between the original value of $124,000 and the edited value of $125,000 corresponds to a degree of change score of 0.1 (i.e., a score tentatively indicating a relatively low probability that the first edit is an unexpected edit).

In step 212 (see FIG. 2A), tagged critical content analyzer 112 (see FIG. 1) determines from retrieving tagged critical content from data repository 122 (see FIG. 1) that users who had previously edited cell 306 of previous versions of spreadsheet 302 had tagged the content in cell 306 as being critical content. Because of the previous tagging of the content in cell 306, tagged critical content analyzer 112 (see FIG. 1) assigns a tagged critical content score of 1 to the first edit (i.e., a score tentatively indicating a high probability that the first edit is an unexpected edit).

In step 214 (see FIG. 2A), machine learning system 114 (see FIG. 1) uses a machine learning classification to determine an edit risk score is 0.525 by finding the mean of the aforementioned scores determined in steps 206, 208, 210, and 212 (i.e., (1+0+0.1+1)/4=0.525).

In step 216 (see FIG. 2B), content edit control system 104 (see FIG. 1) determines that the edit risk score of 0.525 is not greater than the threshold score of 0.7, and because the edit risk score does not exceed the threshold score, content edit control system 104 (see FIG. 1) in step 222 (see FIG. 2B) updates the cost of Asset A from $124,000 to $125,000, as shown in cell 308 in edited spreadsheet 304.

For the second edit, in step 202 (see FIG. 2A), content edit control system 104 (see FIG. 1) determines that the user is performing the second edit of a cell 310 in spreadsheet 302. The second edit updates the $100,000 cost of Asset B (i.e., the $100,000 value in cell 310) to an updated value of $10,000, as shown in a cell 312 in edited spreadsheet 304. In step 204 (see FIG. 2A), content edit control system 104 (see FIG. 1) extracts the value of $100,000 from cell 310 being edited by the user. In step 206 (see FIG. 2A), NLP analyzer 106 (see FIG. 1) determines that the second edit of cell 310 is associated with the word "COST" and determines that the word "COST" indicates a highly sensitive topic (i.e., the cost of an asset identified by the name in the column labeled "ASSET"). Because cell 310 includes a value associated with a highly sensitive topic, NLP analyzer 106 (see FIG. 1) assigns a criticality score of 1 to the second edit (i.e., a score tentatively indicating a high probability of the second edit being an unexpected edit).

In step 208 (see FIG. 2A), user behavior analyzer 110 (see FIG. 1) identifies the current editing behavior of the user as editing a cell that includes a cost associated with an asset's name, determines from historical editing behavior of the user retrieved from data repository 120 (see FIG. 1) that the user has previously edited cells in previous versions of spreadsheet 302 that include costs associated with names of assets, and determines that the current editing behavior matches the historical editing behavior of the user. Based on the match to the historical editing behavior, user behavior analyzer 110 (see FIG. 1) assigns a user behavior score of 0 to the current editing behavior (i.e., a score tentatively indicating a low probability that the second edit is an unexpected edit). In one embodiment, content edit control system 104 (see FIG. 1) provides options for a user to opt in and opt out of the collection, storage, and/or retrieval of the user's editing behavior by user behavior analyzer 110 (see FIG. 1).

In step 210 (see FIG. 2A), degree of change analyzer 108 (see FIG. 1) determines a degree of change associated with the second edit. The second edit will change the $100,000 value to a value of $10,000, which is shown in spreadsheet 304. Degree of change analyzer 108 (see FIG. 1) determines in step 210 that the $90,000 difference between the original value of $100,000 and the edited value of $10,000 corresponds to a degree of change score of 0.9 (i.e., a score tentatively indicating a relatively high probability that the second edit is an unexpected edit).

In step 212 (see FIG. 2A), tagged critical content analyzer 112 (see FIG. 1) determines from retrieving tagged critical content from data repository 122 (see FIG. 1) that users who had previously edited cell 310 in previous versions of spreadsheet 302 had tagged the content in cell 310 as being critical content. Because of the previous tagging of the content in cell 310, tagged critical content analyzer 112 (see FIG. 1) assigns a tagged critical content score of 1 to the second edit (i.e., a score tentatively indicating a high probability that the second edit is an unexpected edit).

In step 214 (see FIG. 2A), machine learning system 114 (see FIG. 1) uses a machine learning classification to determine an edit risk score is 0.725 by finding the mean of the aforementioned scores determined in steps 206, 208, 210, and 212 (i.e., (1+0+0.9+1)/4=0.725).

In step 216 (see FIG. 2B), content edit control system 104 (see FIG. 1) determines that the edit risk score of 0.725 is greater than the threshold score of 0.7. Because the edit risk score exceeds the threshold score, content edit control system 104 (see FIG. 1) in step 218 (see FIG. 2B) transmits alert 118 (see FIG. 1) to the user to notify the user that the second edit is an unexpected edit that is likely to pose a risk to the accuracy of the spreadsheet. In step 220, content edit control system 104 (see FIG. 1) receives an indication from the user to undo the second edit, and in response, content edit control system 104 (see FIG. 1) undoes the second edit to change the value back to $100,000 and loops back in the process of FIGS. 2A-2B to step 202 in FIG. 2A to determine whether the user is performing a new edit of the value of $100,000.

Computer System

Figure 4:
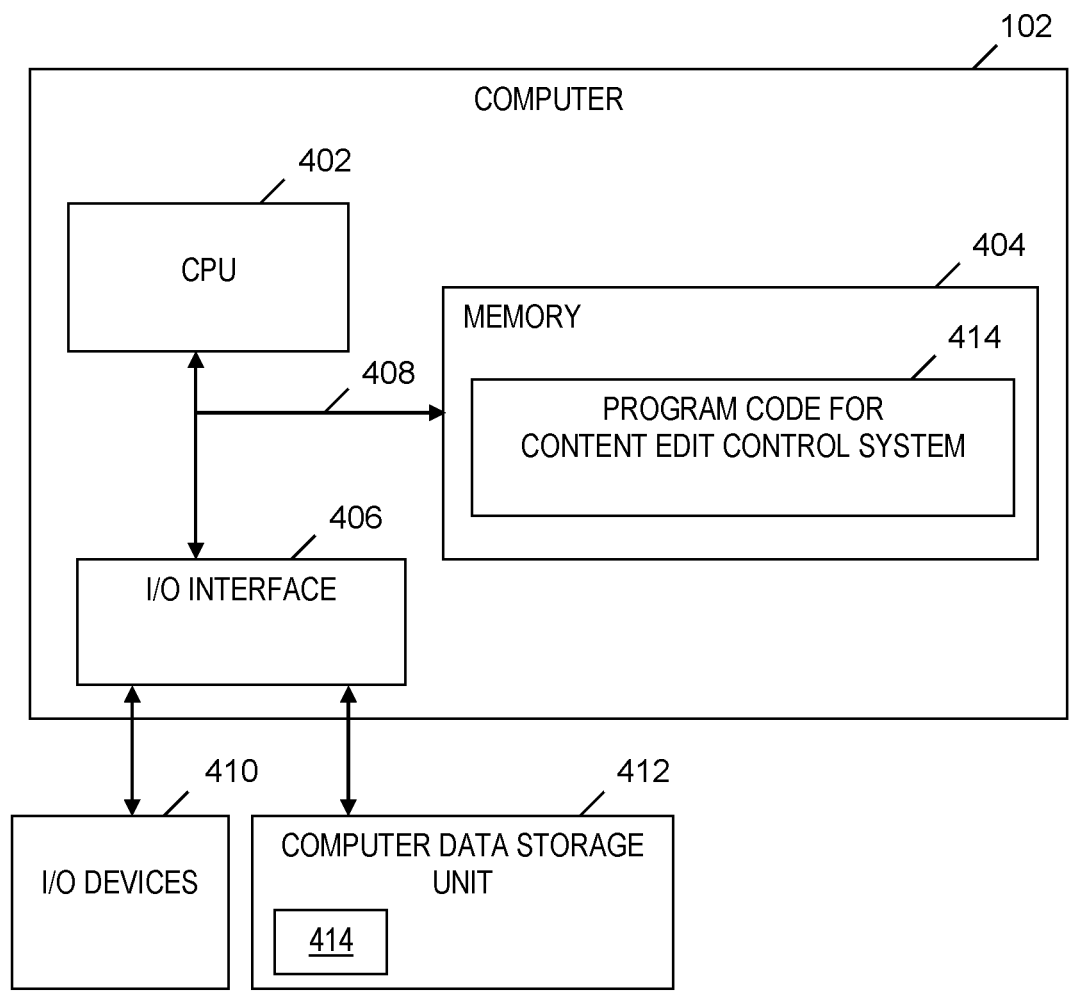
FIG. 4 is a block diagram of a computer included in the system of FIG. 1 and that implements the process of FIGS. 2A-2B, in accordance with embodiments of the present invention.

FIG. 4 is a block diagram of a computer included in the system of FIG. 1 and that implements the process of FIGS. 2A-2B, in accordance with embodiments of the present invention. Computer 102 is a computer system that generally includes a central processing unit (CPU) 402, a memory 404, an input/output (I/O) interface 406, and a bus 408. Further, computer 102 is coupled to I/O devices 410 and a computer data storage unit 412. CPU 402 performs computation and control functions of computer 102, including executing instructions included in program code 414 for a system that includes content edit control system 104 (see FIG. 1) to perform a method of controlling an edit of content, where the instructions are executed by CPU 402 via memory 404. CPU 402 may include a single processing unit or be distributed across one or more processing units in one or more locations (e.g., on a client and server).

Memory 404 includes a known computer readable storage medium, which is described below. In one embodiment, cache memory elements of memory 404 provide temporary storage of at least some program code (e.g., program code 414) in order to reduce the number of times code must be retrieved from bulk storage while instructions of the program code are executed. Moreover, similar to CPU 402, memory 404 may reside at a single physical location, including one or more types of data storage, or be distributed across a plurality of physical systems in various forms. Further, memory 404 can include data distributed across, for example, a local area network (LAN) or a wide area network (WAN).

I/O interface 406 includes any system for exchanging information to or from an external source. I/O devices 410 include any known type of external device, including a display, keyboard, etc. Bus 408 provides a communication link between each of the components in computer 102, and may include any type of transmission link, including electrical, optical, wireless, etc.

I/O interface 406 also allows computer 102 to store information (e.g., data or program instructions such as program code 414) on and retrieve the information from computer data storage unit 412 or another computer data storage unit (not shown). Computer data storage unit 412 includes a known computer readable storage medium, which is described below. In one embodiment, computer data storage unit 412 is a non-volatile data storage device, such as, for example, a solid-state drive (SSD), a network-attached storage (NAS) array, a storage area network (SAN)

array, a magnetic disk drive (i.e., hard disk drive), or an optical disc drive (e.g., a CD-ROM drive which receives a CD-ROM disk or a DVD drive which receives a DVD disc).

Memory 404 and/or storage unit 412 may store computer program code 414 that includes instructions that are executed by CPU 402 via memory 404 to control an edit of content. Although FIG. 4 depicts memory 404 as including program code, the present invention contemplates embodiments in which memory 404 does not include all of code 414 simultaneously, but instead at one time includes only a portion of code 414.

Further, memory 404 may include an operating system (not shown) and may include other systems not shown in FIG. 4.

In one embodiment, computer data storage unit 412 includes data repository 120 (see FIG. 1) and data repository 122 (see FIG. 1).

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to controlling an edit of content. Thus, an embodiment of the present invention discloses a process for supporting computer infrastructure, where the process includes providing at least one support service for at least one of integrating, hosting, maintaining and deploying computer-readable code (e.g., program code 414) in a computer system (e.g., computer 102) including one or more processors (e.g., CPU 402), wherein the processor(s) carry out instructions contained in the code causing the computer system to control an edit of content. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of controlling an edit of content.

While it is understood that program code 414 for controlling an edit of content may be deployed by manually loading directly in client, server and proxy computers (not shown) via loading a computer-readable storage medium (e.g., computer data storage unit 412), program code 414 may also be automatically or semi-automatically deployed into computer 102 by sending program code 414 to a central server or a group of central servers. Program code 414 is then downloaded into client computers (e.g., computer 102) that will execute program code 414. Alternatively, program code 414 is sent directly to the client computer via e-mail. Program code 414 is then either detached to a directory on the client computer or loaded into a directory on the client computer by a button on the e-mail that executes a program that detaches program code 414 into a directory. Another alternative is to send program code 414 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 414 is transmitted to the proxy server and then it is stored on the proxy server.

Another embodiment of the invention provides a method that performs the process steps on a subscription, advertising and/or fee basis. That is, a service provider can offer to create, maintain, support, etc. a process of controlling an edit of content. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product at any possible technical detail level of integration. The computer program product may include a computer readable storage medium (or media) (i.e., memory 404 and computer data storage unit 412) having computer readable program instructions 414 thereon for causing a processor (e.g., CPU 402) to carry out aspects of the present invention.

The computer readable storage medium can be a tangible device that can retain and store instructions (e.g., program code 414) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 414) described herein can be downloaded to respective computing/processing devices (e.g., computer 102) from a computer readable storage medium or to an external computer or external storage device (e.g., computer data storage unit 412) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 414) for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIGS. 2A-2B) and/or block diagrams (e.g., FIG. 1 and FIG. 4) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 414).

These computer readable program instructions may be provided to a processor (e.g., CPU 402) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 412) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 414) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method comprising:
   determining, by one or more processors, that an edit of content is being performed by a user;
   determining, by the one or more processors, a criticality score of the content by using a natural language processing technique, the criticality score indicating a measure of sensitivity of the content;
   identifying, by the one or more processors, a behavior of the user while editing the content;
   determining, by the one or more processors, a measure of deviation between the behavior of the user and a pattern of historical behavior of one or more users while the one or more users edited the content;
   based on the criticality score and the measure of the deviation between the behavior of the user and the pattern of historical behavior, determining, by the one or more processors, an edit risk score indicating a probability that the edit of the content is an unexpected edit of the content;
   determining, by the one or more processors, that the edit risk score exceeds a threshold score;
   responsive to determining that the edit risk score exceeds the threshold score, transmitting, by the one or more processors, an alert to the user indicating to the user that the edit of the content is the unexpected edit;
   assigning, by the one or more processors, a first weight to the criticality score;
   determining, by the one or more processors, a user behavior score indicating the measure of the deviation between the behavior of the user and the pattern of the historical behavior of the one or more users; and
   assigning, by the one or more processors, a second weight to the user behavior score,
   wherein the determining the edit risk score includes averaging a sum of the criticality score weighted by the first weight and the user behavior score weighted by the second weight.

2. The method of claim 1, further comprising:
   prior to the determining that the edit of the content is being performed, tagging, by the one or more processors, the content as being critical by one or more other users; and training, by the one or more processors, a machine learning model by using the tagged content, wherein the determining the edit risk score is further based on the trained machine learning model and the tagged content.

3. The method of claim 1, further comprising:
tagging, by the one or more processors, other content as being critical by the user;
determining, by the one or more processors, that an edit of the other content is being performed by another user; and
responsive to the tagging the other content as being critical and the determining that the edit of the other content is being performed by the other user, transmitting, by the one or more processors, a notification to the other user indicating to the other user that the edit of the other content is an unexpected edit of the other content.

4. The method of claim 1, further comprising:
determining, by the one or more processors, (i) that the edit of the content includes an edit of a structural element of the content and (ii) an amount of editing of the content that is included in the edit of the content;
retrieving, by the one or more processors, a history of edits of the structural elements of the content by the user;
determining, by the one or more processors, a first score indicating whether the edit of the structural element of the content matches the history of edits of the structural elements of the content;
retrieving, by the one or more processors, a history of amounts of editing of the content by respective users;
determining, by the one or more processors, a second score indicating whether the amount of editing of the content matches the history of the amounts of editing of the content; and
determining, by the one or more processors, a user behavior score based on the first score and the second score, wherein determining the edit risk score is further based on the user behavior score.

5. The method of claim 1, further comprising:
determining, by the one or more processors, a degree of change in the edit of the content; and
determining, by the one or more processors, a degree of change score based on the degree of change, wherein the determining the edit risk score is further based on the degree of change score.

6. The method of claim 1, further comprising:
determining, by the one or more processors, that multiple edits of the content are occurring over a given time period at a frequency that exceeds a frequency threshold; and
based on the frequency of the multiple edits exceeding the frequency threshold, increasing, by the one or more processors, the first and second weights, wherein the edit risk score is based on the increased first and second weights.

7. The method of claim 1, further comprising:
receiving, by the one or more processors, one or more instructions from the user to (i) complete the edit of the content even though the edit of the content is the unexpected edit and (ii) tag the content as being critical;
based on the one or more instructions from the user, completing, by the one or more processors, the edit of the content, which results in an edited content;
based on the one or more instructions from the user and subsequent to the completing the edit of the content, tagging, by the one or more processors, the edited content as being critical content;
subsequent to the tagging the edited content, determining, by the one or more processors, that a second edit of the edited content is being performed by a second user; and
based on the edited content being tagged as critical content, determining that the second edit of the edited content is an unexpected edit of the edited content, without a determination of a criticality score of the edited content or a determination of a behavior of the second user while editing the edited content.

8. The method of claim 1, further comprising the step of:
providing at least one support service for at least one of creating, integrating, hosting, maintaining, and deploying computer readable program code in a computer, the program code being executed by a processor of the computer to implement determining that the edit of the content is being performed by the user, determining the criticality score, identifying the behavior of the user, determining the measure of the deviation between the behavior of the user and the pattern of the historical behavior of the one or more users, determining the edit risk score, determining that the edit risk score exceeds the threshold score, transmitting the alert to the user, assigning the first weight to the criticality score, determining the user behavior score, and assigning the second weight to the user behavior score.

9. A computer program product comprising:
a computer readable storage medium having computer readable program code stored on the computer readable storage medium, the computer readable program code being executed by a central processing unit (CPU) of a computer system to cause the computer system to perform a method comprising the steps of:
the computer system determining that an edit of content is being performed by a user;
the computer system determining a criticality score of the content by using a natural language processing technique, the criticality score indicating a measure of sensitivity of the content;
the computer system identifying a behavior of the user while editing the content;
the computer system determining a measure of deviation between the behavior of the user and a pattern of historical behavior of one or more users while the one or more users edited the content;
based on the criticality score and the measure of the deviation between the behavior of the user and the pattern of historical behavior, the computer system determining an edit risk score indicating a probability that the edit of the content is an unexpected edit of the content;
the computer system determining that the edit risk score exceeds a threshold score;
responsive to determining that the edit risk score exceeds the threshold score, the computer system transmitting an alert to the user indicating to the user that the edit of the content is the unexpected edit;
the computer system assigning a first weight to the criticality score;
the computer system determining a user behavior score indicating the measure of the deviation between the behavior of the user and the pattern of the historical behavior of the one or more users; and
the computer system assigning a second weight to the user behavior score, wherein the determining the edit risk score includes averaging a sum of the criticality score weighted by the first weight and the user behavior score weighted by the second weight.

10. The computer program product of claim 9, wherein the method further comprises:
prior to the determining that the edit of the content is being performed, the computer system tagging the content as being critical by one or more other users; and
the computer system training a machine learning model by using the tagged content, wherein the determining the edit risk score is further based on the trained machine learning model and the tagged content.

11. The computer program product of claim 9, wherein the method further comprises:
the computer system tagging other content as being critical by the user;
the computer system determining that an edit of the other content is being performed by another user; and
responsive to the tagging the other content as being critical and the determining that the edit of the other content is being performed by the other user, the computer system transmitting a notification to the other user indicating to the other user that the edit of the other content is an unexpected edit of the other content.

12. The computer program product of claim 9, wherein the method further comprises:
the computer system determining (i) that the edit of the content includes an edit of a structural element of the content and (ii) an amount of editing of the content that is included in the edit of the content;
the computer system retrieving a history of edits of the structural elements of the content by the user;
the computer system determining a first score indicating whether the edit of the structural element of the content matches the history of edits of the structural elements of the content;
the computer system retrieving a history of amounts of editing of the content by respective users;
the computer system determining a second score indicating whether the amount of editing of the content matches the history of the amounts of editing of the content; and
the computer system determining a user behavior score based on the first score and the second score, wherein determining the edit risk score is further based on the user behavior score.

13. The computer program product of claim 9, wherein the method further comprises:
the computer system determining a degree of change in the edit of the content; and
the computer system determining a degree of change score based on the degree of change, wherein the determining the edit risk score is further based on the degree of change score.

14. A computer system comprising:
a central processing unit (CPU);
a memory coupled to the CPU; and
a computer readable storage medium coupled to the CPU, the computer readable storage medium containing instructions that are executed by the CPU via the memory to implement a method comprising the steps of:
the computer system determining that an edit of content is being performed by a user;
the computer system determining a criticality score of the content by using a natural language processing technique, the criticality score indicating a measure of sensitivity of the content;
the computer system identifying a behavior of the user while editing the content;
the computer system determining a measure of deviation between the behavior of the user and a pattern of historical behavior of one or more users while the one or more users edited the content;
based on the criticality score and the measure of the deviation between the behavior of the user and the pattern of historical behavior, the computer system determining an edit risk score indicating a probability that the edit of the content is an unexpected edit of the content;
the computer system determining that the edit risk score exceeds a threshold score;
responsive to determining that the edit risk score exceeds the threshold score, the computer system transmitting an alert to the user indicating to the user that the edit of the content is the unexpected edit;
the computer system assigning a first weight to the criticality score;
the computer system determining a user behavior score indicating the measure of the deviation between the behavior of the user and the pattern of the historical behavior of the one or more users; and
the computer system assigning a second weight to the user behavior score,
wherein the determining the edit risk score includes averaging a sum of the criticality score weighted by the first weight and the user behavior score weighted by the second weight.

15. The computer system of claim 14, wherein the method further comprises:
prior to the determining that the edit of the content is being performed, the computer system tagging the content as being critical by one or more other users; and
the computer system training a machine learning model by using the tagged content, wherein the determining the edit risk score is further based on the trained machine learning model and the tagged content.

16. The computer system of claim 14, wherein the method further comprises:
the computer system tagging other content as being critical by the user;
the computer system determining that an edit of the other content is being performed by another user; and
responsive to the tagging the other content as being critical and the determining that the edit of the other content is being performed by the other user, the computer system transmitting a notification to the other user indicating to the other user that the edit of the other content is an unexpected edit of the other content.

17. The computer system of claim 14, wherein the method further comprises:
the computer system determining (i) that the edit of the content includes an edit of a structural element of the content and (ii) an amount of editing of the content that is included in the edit of the content;
the computer system retrieving a history of edits of the structural elements of the content by the user;
the computer system determining a first score indicating whether the edit of the structural element of the content matches the history of edits of the structural elements of the content;
the computer system retrieving a history of amounts of editing of the content by respective users;

the computer system determining a second score indicating whether the amount of editing of the content matches the history of the amounts of editing of the content; and the computer system determining a user behavior score based on the first score and the second score, wherein determining the edit risk score is further based on the user behavior score.

18. The computer system of claim 14, wherein the method further comprises:

the computer system determining a degree of change in the edit of the content; and the computer system determining a degree of change score based on the degree of change, wherein the determining the edit risk score is further based on the degree of change score.

* * * * *